United States Patent [19]
Agrawal et al.

[11] Patent Number: 5,889,816
[45] Date of Patent: Mar. 30, 1999

[54] WIRELESS ADAPTER ARCHITECTURE FOR MOBILE COMPUTING

[75] Inventors: Prathima Agrawal, New Providence; Mark Robert Cravatts, Berkeley Heights; John Andrew Trotter; Mani Bhushan Srivastava, both of Chatham, all of N.J.

[73] Assignee: Lucent Technologies, Inc., Murray Hill, N.J.

[21] Appl. No.: 594,617

[22] Filed: Feb. 2, 1996

[51] Int. Cl.$^6$ ............................. H04B 1/30; H04L 5/16
[52] U.S. Cl. ............................. 375/220; 375/222
[58] Field of Search ................... 375/222, 220; 370/312, 349, 447, 436; 455/5.1, 4.2

[56] References Cited

U.S. PATENT DOCUMENTS

| | | | |
|---|---|---|---|
| 4,800,559 | 1/1989 | Florea et al. | 370/94 |
| 5,134,648 | 7/1992 | Hochfield et al. | 379/98 |
| 5,247,566 | 9/1993 | Hiramatsu | 379/58 |
| 5,249,305 | 9/1993 | Wieczorek et al. | 455/54.2 |
| 5,291,604 | 3/1994 | Herz | 395/725 |
| 5,291,609 | 3/1994 | Herz | 395/725 |
| 5,331,640 | 7/1994 | Ledu | 370/110.1 |
| 5,444,869 | 8/1995 | Stricklin et al. | 455/89 |
| 5,479,475 | 12/1995 | Grob et al. | 379/58 |
| 5,533,096 | 7/1996 | Bales | 379/58 |
| 5,550,820 | 8/1996 | Baran | 370/60.1 |
| 5,559,804 | 9/1996 | Amada et al. | 370/95.3 |
| 5,636,140 | 6/1997 | Lee et al. | 364/514 |
| 5,649,001 | 7/1997 | Thomas et al. | 379/93.07 |
| 5,684,801 | 11/1997 | Amitay et al. | 370/447 |

OTHER PUBLICATIONS

*A Testbed For Mobile Network Computing* published in Proc. IEEE Intl. Conference on Communications, ICC by P. Agrawal, et al. 1995.

*A Wireless Architecture For Mobile Computing* published in 2nd USENIZ Symposium on Mobile and Location Independent Computing, Ann Arbor, MI by J. Trotter, et al., Apr. 1995.

Primary Examiner—Stephen Chin
Assistant Examiner—Mohammad Ghayour

[57] ABSTRACT

A adapter for wireless networking provides for reconfigerable media access control and data packet formats. The flexible adapter comprises a modem interface for controlling an RF modem for transmitting data signals to and receiving data signals from another RF modem; a media access control circuit; and a computer system interface circuit. The computer system interface circuit provides an interface between a host computer system, the modem interface circuit and the media access control circuit.

29 Claims, 5 Drawing Sheets

WIRELESS ADAPTER ARCHITECTURE FOR MOBILE COMPUTING

FIELD OF THE INVENTION

This invention relates to the field of packet communication, and more particularly to the field of packet communication with a wireless endpoint.

BACKGROUND OF THE INVENTION

Advances in technology have enabled high speed wireless communication and spurred the growth of wireless, and now mobile computing systems. This technology has enabled many new wireless services and systems including wireless LANs. Wireless LANs are the first step toward a mobile computing environment.

Several systems for mobile and wireless computing have been disclosed. Xerox's tab system uses a small hand-held device, called a tab, as a terminal which then interacts with a surrounding network which contain the intelligence. This allows the users to pick up and use an arbitrary tab and immediately have access to their environment. The tab system has an infra-red link for transmitting and receiving data which allows communication in office size cells that are connected to an installed backbone network.

The Infopad system uses an approach similar to a terminal device, and is connected by a high speed RF modem for access of interactive data. The Infopad relies on the surrounding network to provide the intelligent resources, while acting as a terminal for the data.

An intermediate approach splits the intelligence between the device and the network. Some of the computation can be carried out using powerful processing resources in the backbone network instead of on the mobile system which has limited processing resources as well as a limited power budget. Applications typically utilize as much communications bandwidth as is available by adaptively altering the amount of processing on the backbone network verses at the mobile system.

A third approach places the intelligence in the mobile system and utilizes the backbone network to access other devices on a peer to peer basis. This approach is similar to the current model of networked computing, and is supported by wireless LAN systems running Mobile IP. Mobile IP allows the definition of a mobile subnetwork having many mobile systems associated with it. When communicating with a mobile system, data is first sent to any one of several fixed hosts associated with that subnetwork. The fixed hosts either know where the mobile system is, which base station the mobile system is communicating with, or can determine this by quering a set of other base stations.

The WaveLAN system is a wireless LAN system that allows wireless extension of existing Ethernet networks. The WaveLAN has been used as the physical layer for several mobile computing systems.

Wireless untethered computing allows continual connection of mobile systems to the network backbone as users move around their office, corridors and conference rooms. The system should support several models of access, from terminals to intelligent mobile hosts. In order to support this model, mobile systems must be equipped with suitable wireless interfaces, wireless base stations must be installed and the backbone network must be enhanced to support mobile users. Existing wireless designs were unsuitable to allow flexible and innovative handoff and MAC schemes.

Although considerable progress has been made with the use of wireless technology and broadband networks, many technical problems remained to be solved before a vision of omnipresent tetherless access to multimedia information can be realized. Accordingly, there is a need to provide a flexible hardware architecture which is reconfigurable for different protocols and different radio modem control.

SUMMARY OF THE INVENTION

In accordance with the present invention, there is provided a flexible adapter for wireless networking which provides for reconfigurable media access control and data packet formats. The flexible adapter comprises a modem interface circuit which controls an RF modem for transmitting data signals to and receiving data signals from another modem; a media access control circuit; and a computer system interface circuit for providing an interface between a host computer system, the modem interface circuit, and the media access control circuit.

In further enhancements of the present invention flexible adapter for wireless networking, the modem interface circuit is reconfigurable for different RF modems and is reconfigurable for different data formats.

In a still further enhancement of the present invention flexible adapter for wireless networking, the computer system interface circuit is reconfigurable for different host computer systems.

In yet a further enhancement of the present invention flexible adapter for wireless networking, the media access control circuit is reconfigurable for different media access protocols.

In further enhancements of the present invention flexible adapter for wireless networking, the modem interface circuit comprises a field programmable gate array and the computer system interface circuit comprises a field programmable gate array.

In still a further enhancement of the present invention flexible adapter for wireless networking, the media access conttrol circuit comprises a microprocessor computer circuit which realizes forward error correction of data packets.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited to a packet communication system having a Virtual Channel Connection asynchronous transfer mode (ATM) extended to a wireless endpoint, and shall be described with respect to this application, the methods and apparatus disclosed here can be applied to other packet communication systems with a wireless endpoint.

Figure 1:
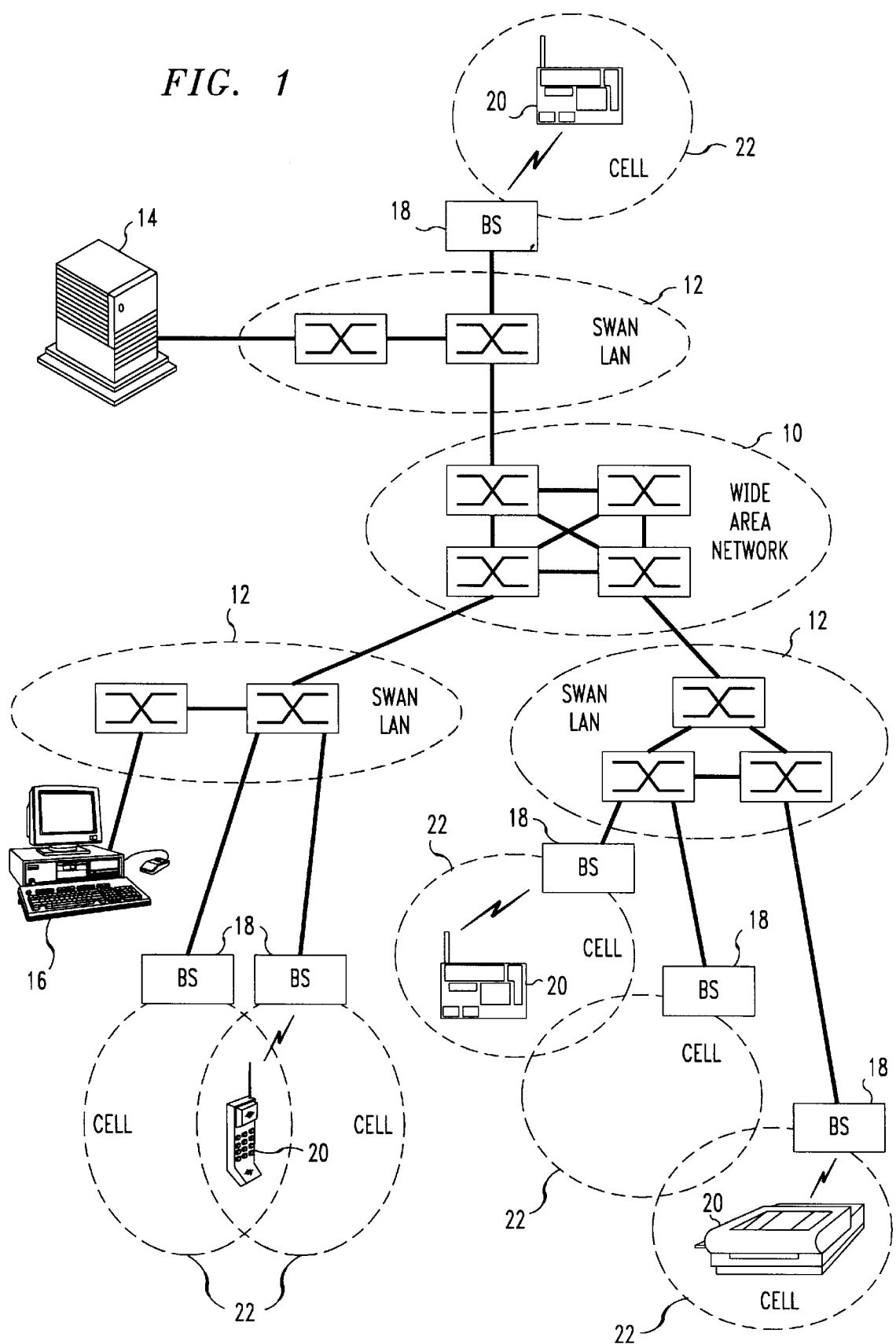
FIG. 1 is a block diagram of a network communication model of a SWAN wireless ATM network.

Referring now to FIG. 1 there is shown a high level view of the network communication model adopted by the SWAN (Seamless Wireless ATM Networking) mobile networked computing environment at AT&T Bell Laboratories. A hierarchy of wide-area 10 and local-area 12 wired ATM networks is used as the back-bone network, while wireless access is used in the last hop to mobile hosts. In addition to connecting conventional wired server hosts 14 and client end-points 16, the wired backbone also connects to special switching nodes called base stations 18. The base stations 18 are equipped with wireless adapter cards, and act as a gateway for communication between nearby mobile hosts 20, which are also equipped with wireless adapters, and the wired network. The geographical area for which a base station acts as the gateway is called its cell 22, and given the intended use of SWAN in an office setting, the various base station 18 nodes are distributed in room-sized pico-cells. Network connectivity is continually maintained as users carrying a variety of mobile hosts 20 roam from one cell 22 to another. The mobile hosts 20 themselves range from portable computers equipped with a suitable wireless adapter, to dumb wireless terminals that have no or little local general-purpose computing resources. All mobile hosts 20 in SWAN, however, must have the ability to participate in network signaling and data transfer protocols. Lastly, a mobile unit 20 in SWAN sends and receives all its traffic through the base station 18 in its current cell 22.

A distinguishing feature of the SWAN system is the use of end-to-end ATM over both the wired network and the wireless last hops 24. This is in contrast to the use of connectionless mobile-IP in present day wireless data LANs. This design choice in SWAN was motivated by the realization that advances in compression algorithms together with increased bandwidth, provided by spatial multiplexing due to the use of pico-cells and higher bandwidth RF transceivers that are now available, can allow the transmission of packetized video to a mobile unit 20. Support for multimedia traffic over the wireless segment has therefore become a driving force in SWAN. Adopting the connection-oriented model of an ATM Virtual Channel Connection over the wireless hop as well allows quality of service guarantees associated with virtual channel connections carrying audio or video traffic to be extended end-to-end. In essence, the use of end-to-end ATM allows the wireless resource to be meaningfully allocated among the various connections going over a wireless hop.

Using ATM's Virtual Channel Connection model all the way through to a mobile host 20, however, results in the need to continually reroute ATM Virtual Channel Connections as a mobile host 20 moves. The small cell sizes and the presence of quality of service sensitive multimedia traffic make this problem particularly important in SWAN. Virtual Channel Connections carrying audio or video, as far as possible, need to be immune from disruptions as a mobile host 20 is hands-off from one base station 18 to a neighboring one. Of course, ATM signaling protocol needs to accomplish the task of Virtual Channel Connection rerouting with minimum latency, and SWAN's approach to this problem is based on Virtual Channel Connection extension coupled with loop removal and mobile initiated partial rebuilds. Of more particular interest is the fact that the lower level protocol layers dealing with wireless medium access must also accomplish the task of transferring a mobile unit 20 from one base station 18 to another with minimal latency. Low latency hand-off and allocation of wireless resources among various virtual connections are therefore tasks that need to be done in the wireless hop 24 in SWAN, in addition to the usual functionality of medium access control and air-interface operation.

Figure 2:
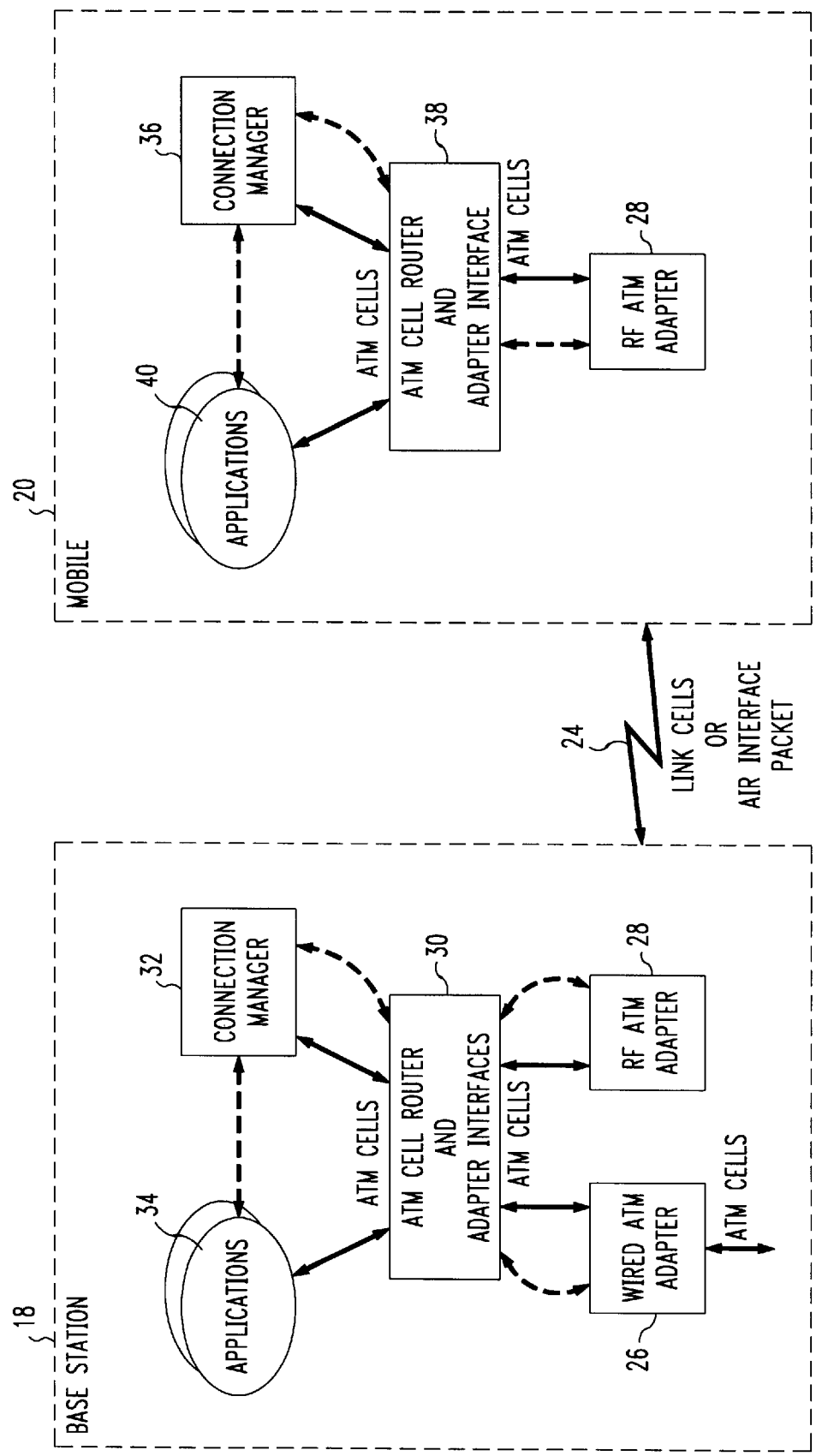
FIG. 2 is a block diagram of a last hop in a wireless ATM network.

FIG. 2 shows a block diagram of the wireless last hop 24 of a SWAN-like wireless ATM network. The primary function of the base station 18 is to switch cells among various wired 26 and wireless ATM 28 adapters attached to the base station 18—the base station 18 can be viewed as an ATM switch that has RF wireless ATM adapters on some of its ports. In SWAN, however, generic PCs and Sun workstation are used as base stations 18 by plugging in a wired ATM adapter card 26 and one or more RF wireless ATM adapter cards 28. The cell switching functionality is realized in software using a kernel-space-resident cell routing and adapter interface module 30, and a user-space-resident connection manager signaling module 32. The use of PCs and workstation for base stations 18 allows them to act as wired hosts as well, running application processes 34. In essence, base stations 18 in SWAN are nothing but computers with banks of radios interfaced.

At the other end of the wireless last hop 24 is the mobile unit 20 that too has a RF wireless adapter 28, a connection signaling manager module 36, and a module 38 that routes cells among various agents within the mobile unit. Although pictorially the mobile unit 20 may look like a base station 18 with no wired adapter and only one wireless adapter 28, this is not the complete truth. The connection manager 36 at the mobile unit 20 is different—for example, it does not have to provide a switch-like functionality. In addition, mobile units 20 such as dumb terminals may have only hardware agents acting as sinks as sources of ATM cells, as opposed to software processes. However, mobile units 20 that are more than a dumb terminal may run applications 40 as well.

Of particular interest is the RF ATM adapter 28 of the base station 18, the RF ATM adapter of the mobile unit 20 and their interconnection by an air interface packet (link cell) over the wireless last hop 24. A stream of ATM cells from the higher level ATM layers needs to be transported across the wireless link 24 between a mobile unit 20 and its base station 18. The issues that need to be addressed to accomplish the transport of ATM cells over the air can be classified into two-categories: generic issues and ATM-specific issues.

Following are some of the problems that fall under the generic category: (1) Division of available bandwidth into channels (2) Distribution of channels among base stations (3) Regulation of access to a shared channel (4) Hand-off of mobile units from one base station 18 to another.

On the other hand, the following wireless hop problems are influenced principally by the needs of ATM: (1) Mapping of ATM cells to link cells, or air-interface packets (2) Format of air-interface packets (3) Impact of ATM cell loss due to noise and interference sources unique to wireless, such as inter-symbol interference, adjacent channel interference, frequency collision etc., and (4) Multiplexing and scheduling of different ATM Virtual Channel Connections in the same channel.

The answers to these problems depend partially on the restrictions imposed by the hardware, and in particular on the characteristics of the radio transceiver.

Figure 3:
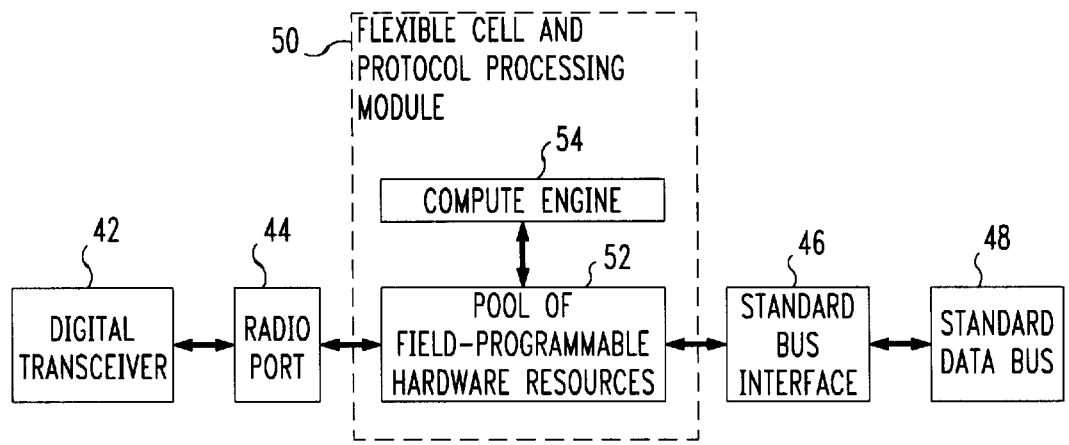
FIG. 3 is a block diagram of a reusable ATM wireless adapter architecture template.

The wireless hop in SWAN is based around the idea of a single reusable ATM wireless adapter architecture, shown in FIG. 3, that interfaces to one or more digital-in digital-out radio transceivers 42 on one side through a radio port interface 44, to a standard bus interface 46 coupled to a standard data bus 48 on the other side, and has a standard core module 50 sandwiched in between providing field-programmable hardware resources 52 and a software-programmable embedded compute engine 54 to realize the necessary data processing. Multiple implementations of this basic architecture could be made with differing form factor, different bus interfaces, and different radios, but all with the same core data processing module. This provides a uniform mechanism for making devices SWAN-ready. The adapter could be configured for algorithms by reprogramming the embedded software, and by reconfiguring the field-programmable hardware. System level board synthesis tools with interface synthesis and parameterized library capabilities, such as the SIERA system from Berkeley can be used to easily generate variations of the basic adapter architecture for different busses and radios.

Figure 4:
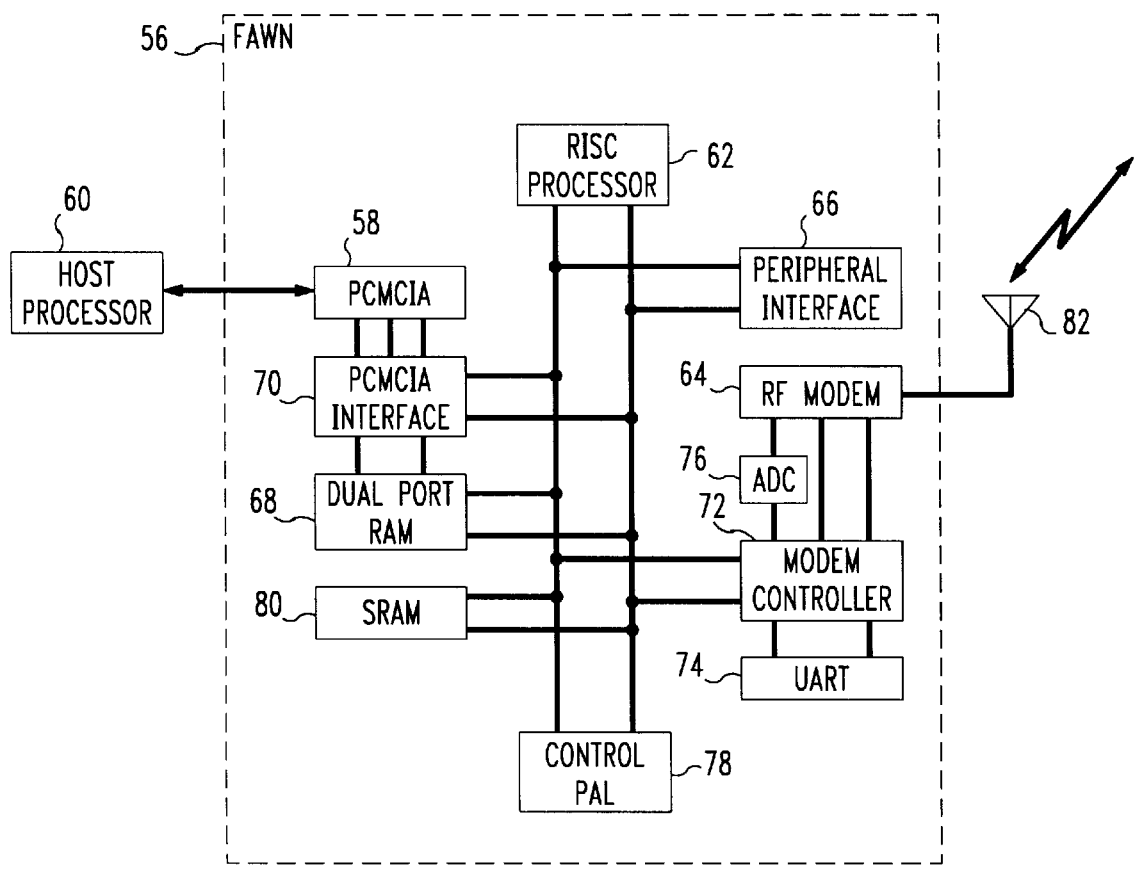
FIG. 4 is a block diagram of a FAWN adapter architecture.

Referring to FIG. 4, there is shown a block diagram of a FAWN (Flexible Adapter for Wireless Networking) adapter architecture. The FAWN card 56 uses a PCMCIA bus 58 to interface with the host computer 60. A laptop computer with a PCMCIA slot can become a mobile host by plugging in a FAWN card 56.

The FAWN card 56 has a RISC processor 62, such as ARM 610 CPU, which is responsible for controlling the RF modem 64 and other peripherals through a peripheral interface 66. The FAWN card 56 is configured for use with the 2.4 GHz Industrial Scientific and Medical (ISM) band frequency hopping spread spectrum transceivers, although the transceiver interface can be easily modified by reprogramming some components, which is well known to one ordinarily skilled in the art. The RISC processor 62 operates at 20 MHz and provides sufficient processing capacity for performing the kernel, signaling and transport protocol functions.

The communication between the RISC processor 62 and the host computer 60, in a base station 18 or a mobile unit 20, utilizes a dual-port memory based interface 68 over the PCMCIA interface 70. The interface is implemented with a Field Programmable Gate Array (FPGA). There are two access modes, one mode accesses any of the CPU's peripherals, but takes longer as the interface must arbitrate for the FAWN CPU's internal bus. As each side of the dual port RAM 68 can be accessed at full speed by the host CPU and the FAWN CPU 62 the data transfers can occur at a maximum speed.

The dual port RAM 68 provides a high speed interface between the host computer and the adapter card. The dual port RAM 68 is used to implement the queues necessary for communication between the host computer 60 and FAWN. By using a RAM structure, as opposed to a FIFO structure, the implementation of arbitrary queue structures with differing sizes and priorities is easy. When FAWN is used as an embedded controller, communication between the MAC process and the higher level processes still continues using the dual port RAM 68, allowing a standard interface to be presented to all applications, wherever they run. The dual port RAM 68 provides support for semaphores to ensure that two identical locations are never accessed at the same time by the host and FAWN. 32K bytes of dual port RAM 68 are provided. The dual port RAM 68 also facilitates the conversion of the 32 bit word used by FAWN's CPU to the 16 bit word needed by the PCMCIA interface.

A modem controller 72 is implemented utilizing another FPGA and implements many of the low level functions necessary to support wireless access protocols. The modem controller 72 includes a packet buffer and a hop controller. The packet buffer is 64bytes long and allows the buffering of a complete ATM packet as well as extra space for encapsulation and error control bits. The modem controller 72 implements four such buffers, two for transmit and two for receive. During a receive operation one of the two receive buffers slowly fills up, at the data rate. When the buffer is full an interrupt is generated so that the CPU can empty the buffer all at once, meanwhile the other buffer begins to fill from the data stream. During transmit operation the CPU fills a transmit buffer then sets a bit to tell the modem controller 72 that the buffer is ready to be sent. The buffer is then made available to the UART 74 at the data rate. Once the buffer has been sent the modem controller 72 generates an interrupt so that the CPU knows that the buffer is now available to be filled. Meanwhile the second transmit buffer can be sent. The provision of these buffers allows the CPU to be decoupled from the low level byte based transceive operations.

An RF modem 64, such as a 2.4 GHz FHSS (Frequency Hopping Spread Spectrum) modem, provides a logic level interface for data and control, as well as an analog received signal strength indicator. This band permits 83 channels of 1 MHz for frequency hopping. Currently a GEC Plessey modem can support 83 channels at a 625 Kbits/sec raw bandwidth and will support a 1.2 Mbits/sec bandwidth in another version. The modem's interface permits selection of 1 of the 83 channels, the power level, and 1 of 2 antennas. The modem 64 supplies a bit stream to a UART 74 during receive and accepts a bit stream during transmit. The UART 74 converts the bit stream from the modem 64 to bytes during receive, stripping the relevant synchronization bits and providing bytes to the controlling FPGA (modem controller) 72. During transmission the UART 74 adds synchronization bits and feeds the bit stream to the modem 64. The FPGA (modem controller) 72 includes four 64 byte buffers which store packets of data to and from the UART 74. This allows the UART 74 to asynchronously transmit and receive data without having to interrupt the FAWN CPU 62. The FPGA 72 (modem controller) includes a resettable counter operating at 1 MHz which can be utilized as a real time timer for protocol and task scheduling. An Analog to Digital Converter (ADC) 76 and low pass filter allow the received signal strength to be read by the FAWN CPU 62. A Control PAL 78 is contained within the FAWN adapter 56. The FAWN card 56 includes 4 Mbytes of SRAM 80 for program and data storage.

For practical purposes, therefore, the nature of the wireless hop in SWAN depends on the characteristics of the particular radio transceiver that is supported by the FAWN adapter 56. With respect to slow frequency hopping, the primary radio transceiver used in SWAN is the DE6003 radio from GEC Plessey. DE6003 is a half-duplex slow frequency hopping radio operating in the 2.4 GHz ISM band, and has a data rate of 625 Kbps. Further, the radio has two power levels, and has two selectable radio antennas 82. Legal requirements dictate that the radio must be operated in such a fashion that it hop pseudo-randomly among at least 75 of the 83 available 1 MHz wide frequency slots in the 2.400 to 2.4835 MHz region such that no more than 0.4 seconds are spent in a slot every 30 seconds. Communicating transceivers hop according to a pre-determined pseudo-random hopping sequence that is known to all of them.

Figure 5:
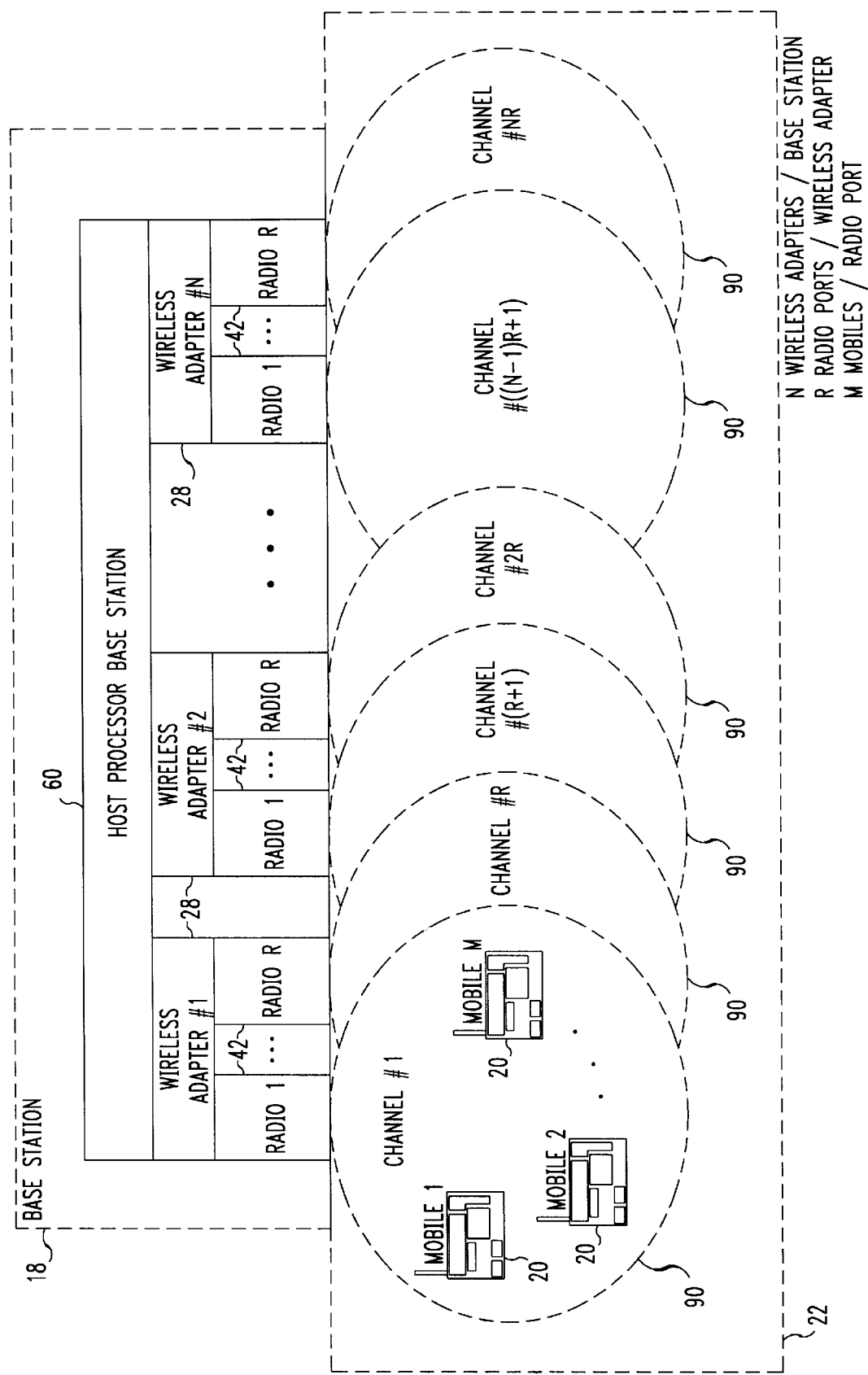
FIG. 5 is a block diagram of a base station and mobile units in SWAN.

FIG. 5 shows the abstract architecture of a typical base station in SWAN. A base station 18 consists of multiple wireless ATM adapter cards 28 plugged into its backplane, with each card 28 handling multiple radio transceivers 42. Each radio transceiver 42 is assigned a channel 90 (frequency hopping sequence) that is different from channels 90 assigned to a radio 42 in the current or neighboring base station 18. Typically, in SWAN, a base station 18 has fewer than 3–5 radios 42 per base station 18. The preceding base station organization results in a cellular structure where each cell is covered by multiple co-located channels. A mobile unit 20 in a cell 22 is assigned to one of the radio ports on the base station 18, and frequency hops in synchrony with it.

Since carrying multimedia traffic to the mobile units 20 is a major goal in SWAN, the two important drivers for the medium access control and physical layer control subsystem were low latency hand-offs and support foi multiple simultaneous channels 90 in a given cell 22. In addition, explicit allocation of wireless resources among ATM virtual channel connections is crucial. Finally, at least in the initial implementation, simplicity of implementation was considered desirable. In any case, implementing algorithmic enhancements would be easy because the wireless adapter architecture is based on software and reconfigurable hardware.

The definition of the air-interface packets, and the mapping of ATM cells onto the air-interface packets, depends on the hardware constraints. In SWAN, a standard serial communications controller chip is used in the synchronous mode resulting in the well known Synchronous Data Link Control (SDLC) protocol being used over the air. A SWAN transmitter sends SDLC frames separated by the SDLC SYNC bytes. In order to reduce the interrupt overhead to the software, a physical layer controller drives the serial communications controller. The physical layer controller accepts data units called link cells or air-interface packets from the medium access control layer, and stuffs them into the SDLC frame sent by the serial communications controller chip. The reverse is true on the receiving end. The physical layer controller needs to be in hardware, and its current implementation in the reconfigurable hardware part of the FAWN wireless adapter in SWAN is based on a design that uses fixed 64-byte sized link cells. The higher level medium access control layer communicates with the physical layer in terms of these 64-byte link cells.

Given the constraint of fixed 64-byte sized link cells, the current scheme uses the simple suboptimal strategy of encapsulating a 53 byte ATM cell to a link cell, with the remaining 11 bytes being used for medium access control header and for error control. In addition to the link cell that encapsulates an ATM cell, several other link cells are also defined for signaling purposes.

Consider the interface between ATM Connection Manager and the Medium Access Control Module. In order to schedule the wireless resources among the multiple ATM virtual channel connections going over a wireless channel, the Medium Access Control module maintains a table of per Virtual Channel Connection information. When a new Virtual Channel Connection needs to be opened, the connection manager module sends a request to the Medium Access Control module indicating the bandwidth requirements as the channel time T1 needed by this Virtual Channel Connection over a period of time T2. The Medium Access Control module uses this information to either accept or deny admission to this new Virtual Channel Connection. Further, this bandwidth specification is used by the Medium Access Control module to schedule transmission of cells belonging to different Virtual Channel Connections.

The implementation of the medium access control and physical layer control subsystem for SWAN can be viewed as a three-way hardware-software co-design task where the functionality can be implemented at one of three locations: as software on the base station CPU or the mobile unit CPU, as embedded software on the wireless adapter, and on field programmable hardware on the wireless adapter. In the case of a dumb terminal with an embedded wireless adapter, there is no CPU in the terminal, so that the entire functionality is on the wireless adapter itself. In the current implementation, the physical layer control is implemented on the field programmable hardware on the wireless adapter, the Medium Access Control is implemented as software on the wireless adapter, and the ATM connection manager that Medium Access Control talks to as software either on the base station or mobile unit CPU, or on the wireless adapter itself in the case of a dumb terminal.

Figure 6:
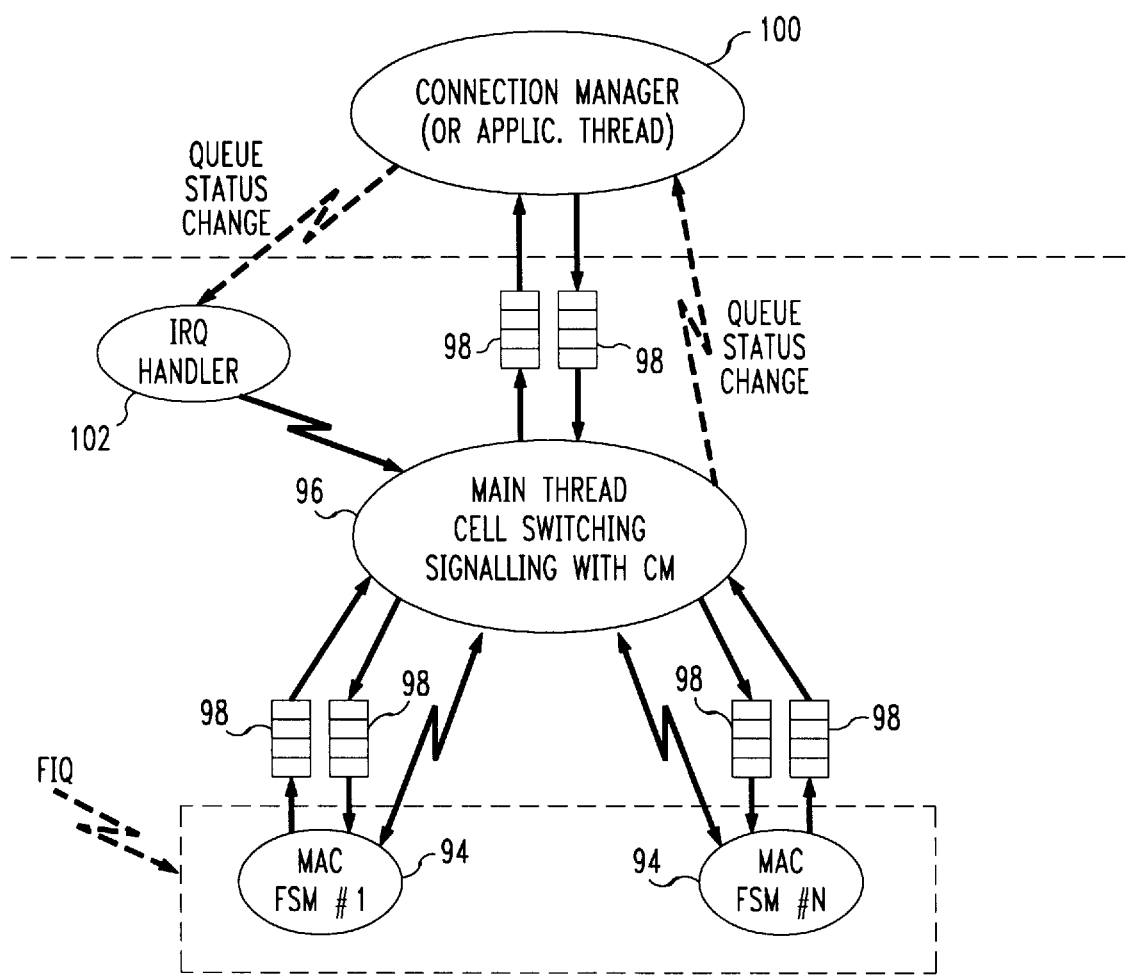
FIG. 6 is a block diagram of embedded software on a wireless adapter.

The organization of the software embedded on the wireless adapter is shown in FIG. 6. The software is organized as a multi-threaded system. The finite state machines corresponding to the Medium Access Control protocol at each radio port are implemented as FSMs 94 running in the interrupt mode. There is one such FSM 94 for each radio port. These can be viewed as very high priority threads. The Medium Access Control FSMs 94 communicate with a main thread 96 that runs in the user mode and handles queue management and dispatching of ATM cells to the Medium Access Control FSMs 94 on one side, and to other threads or to the base station/mobile unit CPU on the other side. The inter-thread communication is done using queues of pointers 98, with the ATM cells themselves being stored in a shared memory area. It is worth pointing out that in the case of dumb terminals with no CPU of their own, the ATM connection manager 100 and the threads that source or sink ATM cells are also run on the embedded CPU (an ARM610 processor) on the wireless adapter. An IRQ Handler 102 processes interrupt requests in response to a queue status change.

The FAWN card has a very flexible architecture which allows the same device to be utilized in both base stations and modile stations. The FAWN card supports high speed interfaces from the host machine to the adapter card using the DPR. Because the FPGA handles the byte level communication operations and only presents the CPU with complete packets the CPU can be left to run MAC level code and still have enough capacity to execute embedded application programs. The MAC and handoff design is aided by the interrupt driven ADC and the real time clock which are available on the card. The processor on the card is responsible for all the low level operations, simplifying the interface presented over the PCMCIA interface which in turn simplifies the software that has to be implemented on the host. This increases the ease with which the system can be integrated with new hosts.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

We claim:

1. A flexible adapter for wireless networking comprising:

at least one reconfigurable modem interface for controlling an RF modem for transmitting data signals to and receiving data signals from another RF modem;

a computing circuit wherein said computing circuit controls a media access control process for data packets of a reconfigurable predetermined format; and a computer system interface circuit for providing an interface between a host computer system, said computing circuit and said modem interface;

wherein said flexible adapter is adapted to be configurable by reprogramming software embedded therein and by reconfiguring hardware thereof that is field programmable.

2. The adapter as recited in claim 1 wherein said computing circuit provides forward error correction for said data packets.

3. The adapter as recited in claim 1 wherein said computer system interface circuit comprises a PCMCIA interface circuit.

4. The adapter as recited in claim 1 wherein said computing system interface circuit comprises a dual port memory circuit.

5. The adapter as recited in claim 1 wherein said reconfigurable modem interface comprises a field programmable gate array.

6. The adapter as recited in claim 1 wherein said computer interface circuit comprises a field programmable gate array.

7. The adapter as recited in claim 1 wherein said computing circuit comprises a RISC computer circuit.

8. The adapter as recited in claim 1 wherein said reconfigurable modem interface further comprises two data transmit buffers for said data packets.

9. The adapter as recited in claim 1 wherein said reconfigurable modem interface further comprises two data receive buffers for said data packets.

10. A flexible adapter for wireless networking comprising:
at least one reconfigurable modem interface for controlling an RF modem for transmitting data signals to and receiving data signals from another RF modem;
a computing circuit wherein said computing circuit controls a media access control process for data packets of a reconfigurable predetermined format;
a computer system interface circuit for providing an interface between a host computer system, said computing circuit and said modem interface; and
a bus coupling said modem interface and said computer system interface circuit;
wherein said flexible adapter is adapted to be configurable by reprogramming software embedded therein and by reconfiguring hardware thereof that is field programmable.

11. The adapter as recited in claim 10 wherein said computing circuit provides forward error correction for said data packets.

12. The adapter as recited in claim 10 wherein said computing circuit controls said media access control process for asynchronous transfer mode data packets.

13. The adapter as recited in claim 10 wherein said computer system interface circuit comprises a dual port memory circuit.

14. The adapter as recited in claim 10 wherein said reconfigurable modem interface comprises a field programmable gate array.

15. The adapter as recited in claim 10 wherein said computer interface circuit comprises a field programmable gate array.

16. The adapter as recited in claim 10 wherein said computing circuit comprises a RISC computer circuit.

17. The adapter as recited in claim 10 wherein said reconfigurable modem interface further comprises two data transmit buffers for said data packets.

18. The adapter as recited in claim 10 wherein said reconfigurable modem interface further comprises two data receive buffers for said data packets.

19. A wireless network adapter comprising:
at least one reconfigurable modem interface circuit wherein said modem interface circuit controls an RF modem for transmitting data signals to another modem and receiving data signals from said another modem;
a media access control circuit;
a computer system interface circuit for providing an interface between a host computer system, said modem interface circuit, and said media access control circuit;
wherein said wireless network adapter is adapted to be configurable by reprogramming software embedded therein and by reconfiguring hardware thereof that is field programmable.

20. The adapter as recited in claim 19 wherein said reconfigurable modem interface circuit is reconfigurable for different RF modems.

21. The adapter as recited in claim 19 wherein said reconfigurable modem interface circuit is reconfigurable for different data formats.

22. A wireless network adapter comprising:
at least one modem interface circuit wherein said modem interface circuit controls an RF modem for transmitting data signals to another modem and receiving data signals from said another modem;
a media access control circuit;
a computer system interface circuit for providing an interface between a host computer system, said modem interface circuit, and said media access control circuit wherein said computer system interface circuit is reconfigurable for different host computer systems.

23. The adapter as recited in claim 19 wherein said media access control circuit is reconfigurable for different media access protocols.

24. The adapter as recited in claim 19 wherein said reconfigurable modem interface circuit comprises a field programmable gate array.

25. The adapter as recited in claim 19 wherein said reconfigurable computer system interface circuit comprises a field programmable gate array.

26. The adapter as recited in claim 19 wherein said media access control circuit comprises a microprocessor computer circuit.

27. The adapter as recited in claim 19 wherein said media access control circuit realizes forward error correction of data packets.

28. A flexible adapter for wireless networking comprising:
at least one modem interface for controlling an RF modem for transmitting data signals to and receiving data signals from another RF modem;
a computing circuit wherein said computing circuit controls a media access control process for data packets of a reconfigurable predetermined format; and
a computer system interface circuit for providing an interface between a host computer system, said computing circuit and said modem interface, wherein said computer system interface circuit is reconfigurable for different host computer systems;
wherein said flexible adapter is adapted to be configurable by reprogramming software embedded therein and by reconfiguring hardware thereof that is field programmable.

29. A flexible adapter for wireless networking comprising:
at least one modem interface for controlling an RF modem for transmitting data signals to and receiving data signals from another RF modem;

a computing circuit wherein said computing circuit controls a media access control process for data packets of a reconfigurable predetermined format;

a computer system interface circuit for providing an interface between a host computer system, said computing circuit and said modem interface, wherein said computer system interface circuit is reconfigurable for different host computer systems; and a bus coupling said modem interface and said computer system interface circuit;

wherein said flexible adapter is adapted to be configurable by reprogramming software embedded therein and by reconfiguring hardware thereof that is field programmable.

* * * * *